United States Patent [19]
Chethik

[11] Patent Number: 5,612,651
[45] Date of Patent: Mar. 18, 1997

[54] MODULATING ARRAY QAM TRANSMITTER

[75] Inventor: Frank Chethik, Palo Alto, Calif.

[73] Assignee: Loral Aerospace Corp., New York, N.Y.

[21] Appl. No.: 582,604

[22] Filed: Jan. 2, 1996

[51] Int. Cl.$^6$ .................................................. H04L 27/36
[52] U.S. Cl. .......................... 332/103; 375/261; 375/298; 375/308
[58] Field of Search ..................................... 332/103, 104, 332/105; 375/261, 279, 280, 281, 298, 308

[56] References Cited

U.S. PATENT DOCUMENTS

| | | | |
|---|---|---|---|
| 4,464,767 | 8/1984 | Bremer | 375/298 |
| 5,237,292 | 8/1993 | Chethik | 332/103 |
| 5,463,355 | 10/1995 | Halloran | 332/103 |

Primary Examiner—Siegfried H. Grimm
Attorney, Agent, or Firm—Perman & Green

[57] ABSTRACT

This invention pertains to a method for producing high power microwave transmission signals conveying one of a plurality of symbols, wherein a symbol represents a plurality of bits, and also to a modulating array transmitter that operates in accordance with the method. The method includes a first step of applying j bits to a data storage device to address the data storage device to output N bits to N/2 QPSK modulators. Each of the N/2 QPSK modulators receives a subset (a pair) of the N bits. Each of the bit pairs specifies one of up to four phase shifts. Within each of the N/2 QPSK modulators, a next step phase modulates a reference (e.g., local oscillator) signal in accordance with a phase shift specified by the received pair of bits. A next step amplifies the outputs of each of the N/2 QPSK modulators to produce respective amplified QPSK modulated signals. A further step combines the amplified QPSK modulated signals by vector addition to produce one of a plurality of symbols, wherein the produced symbol represents a value of the j (even number) input bits. Also disclosed is a BPSK embodiment of the invention, wherein there are N BPSK modulators, each receiving one of the N bits.

15 Claims, 7 Drawing Sheets

| NUMBER OF QPEs | CONSTELLATION | BITS PER SYMBOL | BWE* |
|---|---|---|---|
| 3 | 16 QAM | 4 | 3.0 |
| 7 | 64 QAM | 6 | 4.5 |
| 15 | 256 QAM | 8 | 6.0 |
| 31 | 1024 QAM | 10 | 7.5 |
| 63 | 4096 QAM | 12 | 9.0 |
| 127 | 8192 QAM | 14 | 10.5 |

ALL POSSIBLE STATES OF AN EXAMPLE
3 QPE STAGE MAX

MODULATING ARRAY QAM TRANSMITTER

FIELD OF THE INVENTION

This invention relates in general to signal transmitters, and, in particular, this invention relates to a modulating array transmitter.

BACKGROUND OF THE INVENTION

It is known in the art to produce multiple amplitude and phase modulated signals that can assume discrete states of a multi-state signal constellation. Quadrature Amplitude Modulation (QAM) is one such known technique. Prior devices which have produced such signals have employed the use of elements such as travelling wave tube amplifiers (hereinafter "TWTAs"). A problem may occur during use of TWTAs however, since in order to reduce constellation distortions in applications where constellations are complex and have many possible states (e.g., 64 QAM), TWTAs need to be operated in a high backoff, very linear operating mode. However, when operated in this mode TWTAs do not perform efficiently. Thus, the use of TWTAs is not optimum for applications wherein high operating power efficiency is required with complex QAM waveforms. One such application is a satellite-based transmitter of QAM signals.

In high rate data signal transmission applications, such as satellite applications, wherein it is necessary to transmit microwave signals through severely bandwidth-limited frequency channels, it is a desirable goal to efficiently transmit many data bits per state of a QAM signal constellation.

OBJECTS OF THE INVENTION

It is an object of this invention to provide a modulating array transmitter that efficiently and precisely produces QAM signals where each transmitted QAM symbol represents multiple input data bits.

It is a second object of this invention to provide a modulating array transmitter that is suitable for use in a satellite-based platform, and that efficiently and precisely generates QAM symbols each of which represents a plurality of data bits.

SUMMARY OF THE INVENTION

The foregoing and other problems are overcome and the objects of the invention are realized by a method for producing one of a plurality of QAM symbols, wherein the produced symbol represents j bits, and also by a modulating array transmitter that operates in accordance with the method. The method includes a first step of applying j bits which are to be transmitted to a plurality of inputs of a data storage device. A next step selects a corresponding one of M words stored within the data storage device in response to the applied j bits. Individual ones of the M words stored in the data storage device represent a unique mapping of one of the $2^j$ input words that address the storage device. Thus there are (at least) $2^j$ words in the data storage device, each of which has a length of N bits, where:

$$N=2(2^{j/2}-1);$$

where j is an even integer. In one embodiment of this invention each N-bit word is organized as N/2 bit pairs, and each bit pair read-out from the data storage device is caused to quadraphase modulate a RF carrier. A plurality of N/2 quadraphase (QPSK) modulators are preferably driven from a common local oscillator (LO). Each of the quadraphase modulated carriers is amplified by a power amplifier which is preferably driven into its highest power efficiency mode (at or near saturation). The N/2 power amplifier outputs are combined or summed to produce a plurality of QAM signals, where each signal state corresponds uniquely to one state of the $2^j$ input words.

Further in accordance with the method of this invention, the step of combining the amplified signals produces one of a plurality of symbols of a constellation, wherein the number of symbols of the constellation is $2^j$.

In accordance with a second embodiment of this invention, the step of modulating is performed by BPSK (180° shift keying) modulating a local oscillator signal in accordance with a phase shift specified by one of N bits, and the step of combining the amplified signals produces one of up to $2^j$ symbols of a constellation.

Further in accordance with the embodiments of this invention, the step of combining the amplified signals produces one of M distinct symbols of a constellation, wherein each of the M distinct symbols represents a possible state of the j-bit input to the data storage device.

BRIEF DESCRIPTION OF THE DRAWINGS

The above set forth and other features of the invention are made more apparent in the ensuing Detailed Description of the Invention when read in conjunction with the attached Drawings, wherein:

FIG. 6a illustrates a signal constellation that is produced by the Modulating Array Transmitter of FIG. 5. FIG. 6a also illustrates the vectors of possible digital values that may be input into a quadraphase power element of the Modulating Array Transmitter shown in FIG. 5. FIG. 6a also illustrates vectorial summations performed by the power combiner of FIG. 5 on the possible states that may be generated by the quadraphase power elements of FIG. 5.

DETAILED DESCRIPTION OF THE INVENTION

It should be noted that although the ensuing description is discussed with principal reference to an example of a modulated array transmitter 10 (hereinafter "MAX") (FIG. 3) which permits the transmission of four data bits per symbol, the invention is not intended to be limited as such. For other applications, including those requiring the transmission of considerably large quantities of data bits per symbol, other embodiments of the MAX 10 may be employed to facilitate such transmission as will be discussed below.

Figure 1:
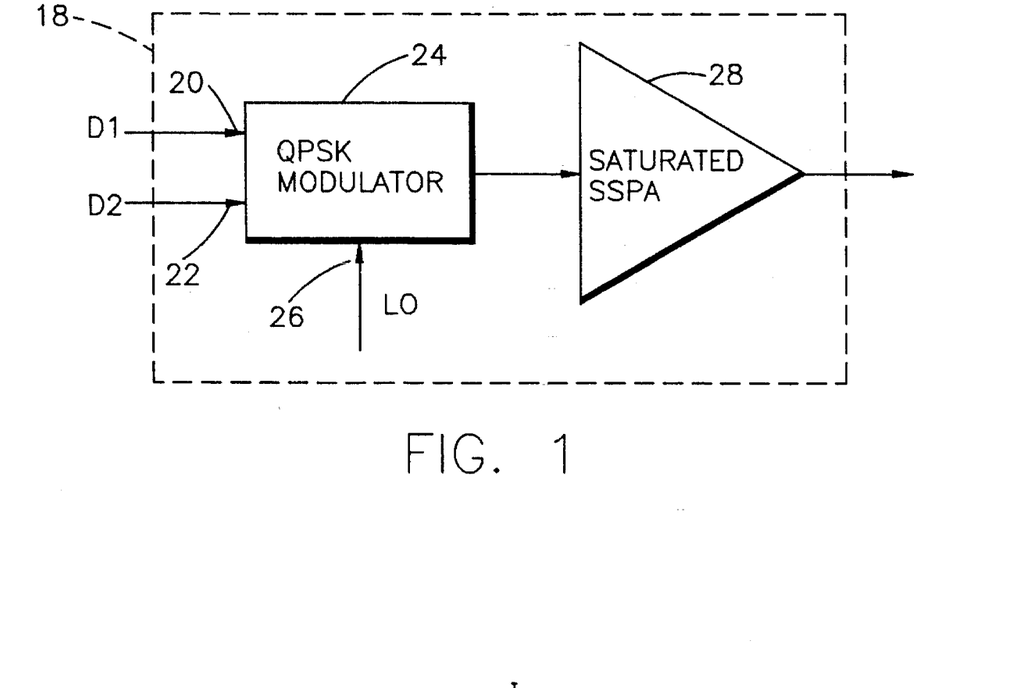
FIG. 1 is an illustration of a QPSK modulator and a solid state power amplifier forming in combination a quadraphase power element, also referred to herein as a QPE.
Figure 3:
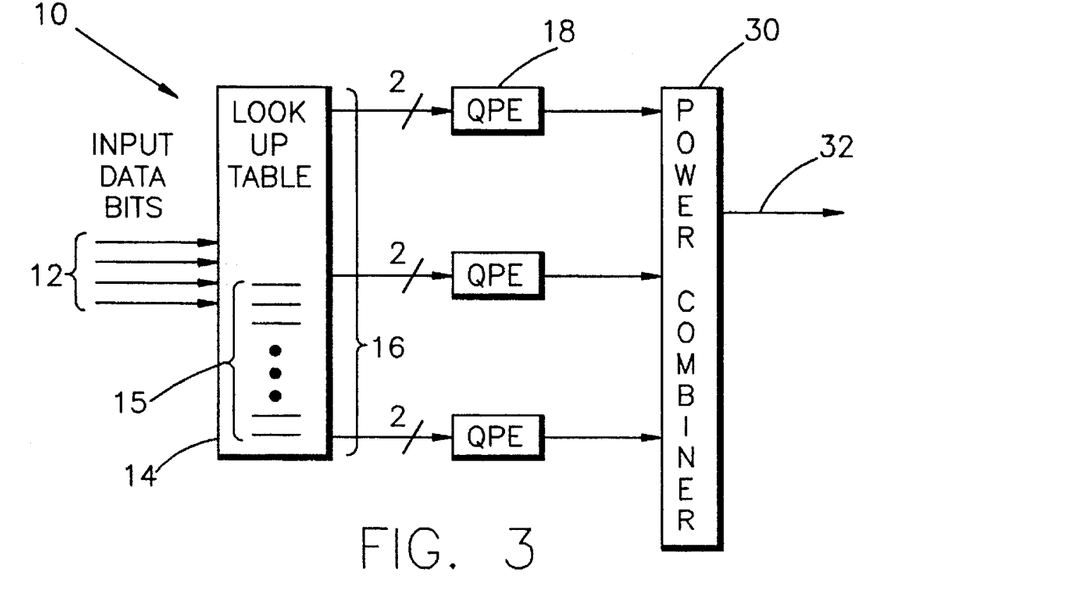
FIG. 3 is an illustration of a Modulating Array Transmitter comprising three quadraphase power elements, a look-up table, and a power combiner.

An example of a MAX 10 is illustrated in FIG. 3. The MAX comprises a data storage device embodied as a digital mapping look-up table 14, a plurality of Quadraphase Power Elements 18 (hereinafter "QPEs"), and a power combiner 30. Referring to FIG. 1, each QPE 18 comprises a quadraphase (hereinafter "QPSK") modulator 24, and a solid state power amplifier (hereinafter "SSPA") 28. The QPSK modulator 24 operates to phase modulate a reference signal (which is shown in FIG. 1 as local oscillator (LO) input signal 26) in accordance with the values of two digital inputs D1 and D2.

The look-up table 14 comprises a plurality of uniquely addressable storage locations 15. At each of the storage locations 15 is stored a preprogrammed binary word comprised of a plurality of bits. In the preferred embodiment of this invention the look-up table is a random access memory (RAM) device having a high read rate. However, any suitable device known in the art for storing bits of binary information and for enabling the selection of the stored bits may be used, such as a ROM. For the example of the MAX 10 shown in FIG. 3, the look-up table 14 is capable of storing one word of six bits at each of sixteen storage locations 15. Each word is considered to be comprised of a plurality of sets of 6-bit values. Within the look-up table 14, the six bits of information stored at a particular location is selected in response to signals applied to inputs 12 of the look-up table 14. For the example of the MAX 10 illustrated in FIG. 3, 4-tuple data bits are input to the look-up table 14 via four inputs. The input signals address a particular corresponding storage location and, in response, digital signals representing one of the 16 sets of 6-bit words stored at the addressed location are simultaneously provided to a plurality of look-up table outputs 16.

Referring to FIG. 1 and FIG. 3, each QPE 18 has inputs that are formed by a first and a second input 20, 22 of a QPSK modulator 24. The first input (D1) 20 is coupled to one of a plurality of look-up table outputs 16, and the second input (D2) 22 is coupled to another one of the plurality of outputs 16. The exact manner in which the first and second inputs 20, 22 are coupled to the plurality of outputs 16, however, is not of particular concern to this invention so long as the configuration permits each QPE 18 to receive a pair of data bits that are output from the look-up table 14. As such, it may be possible that a pair of data bits being applied to one QPE 18 may have values that are different than those of respective data bits being applied to another QPE 18 of the MAX 10.

Within each QPE 18, the pair of data bits are applied to the QPSK modulator 24, wherein the signals are employed (in the preferred embodiment) to QPSK-modulate a local oscillator (LO) signal 26. The QPSK-modulation is performed in a manner known in the art for generating modulated signals that have one of four possible waveform states (hereinafter also referred to as "symbols") such as those represented by, for example, the constellation illustrated in FIG. 2.

Figure 2:
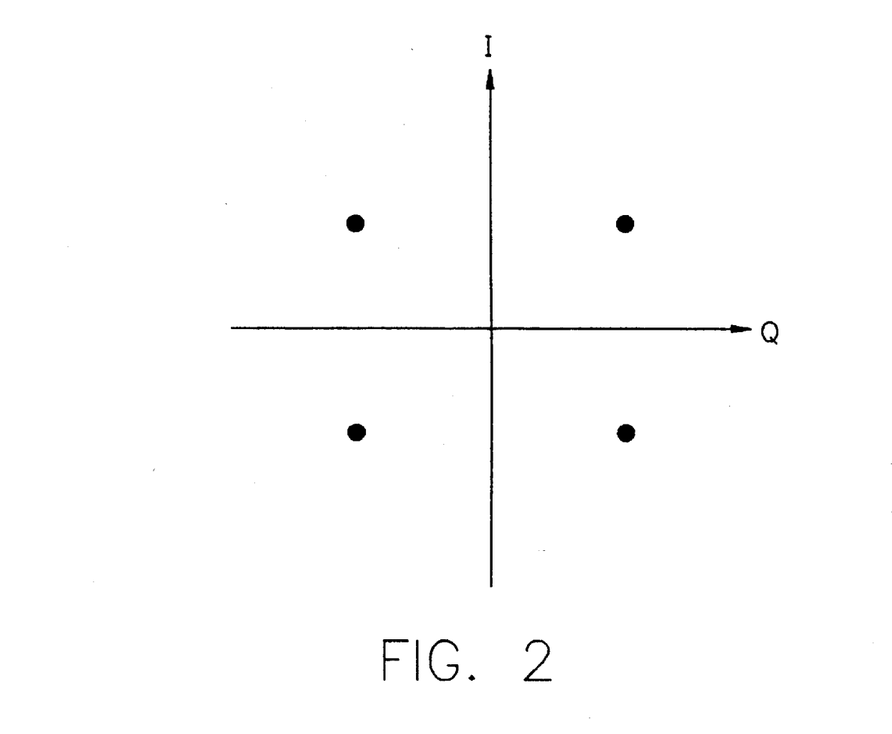
FIG. 2 illustrates a signal constellation representing the four possible states of a signal that is produced by the quadraphase power element of FIG. 1. The signal constellation is represented by points on a complex (I-Q) plane.

A QPSK modulated signal emanating from an output of the QPSK modulator 24 of each individual QPE 18 is represented by one of the four possible states on the constellation shown in FIG. 2. Which particular one of the four possible waveform states the modulated signal will assume is dependent upon the values of the pair of data bits (i.e., 00, 01, 10, 11) that are input to the QPSK modulator 24 via the inputs 20 and 22.

Within a respective QPE 18, after the LO signal is QPSK modulated by the modulator 24, it is amplified by the SSPA 28. Thereafter, the signal is output from the QPE 18 and is applied to the power combiner 30. The power combiner 30 performs a phase coherent vectorial addition of the signals received from each of the QPEs 18. The signal output from the power combiner 30 is forwarded to some further system such as, for example, an antenna.

The number of possible waveform states (amplitude and phase) that a signal output from the power combiner 30 may have is dependent upon the number of QPEs 18 used in the MAX 10, and upon the number of addressable storage locations 15 within the look-up table 14. The number of QPEs 18 and addressable storage locations 15 of the MAX 10 will vary from application to application depending upon the number of bits per symbol that are being transmitted.

For example, the MAX 10 illustrated in FIG. 3 (employing three QPEs 18) can generate a signal having one of sixty-four possible states. This is because there are sixty-four possible sets of digital signal pairs that may be input to the QPEs 18 (i.e., to any one QPE 18 may be applied digital signals pairs having four possible values, thus for three QPEs there are $2^6=64$ possible states).

In that the power combiner 30 effectively performs a vectorial addition on the phase coherent signals emanating from the QPEs 18, in the presently preferred embodiment similar resultant modulation states may occur for different sets of data bit signals that are stored in the look-up table 14. These similarly resulting states are deemed to be "overdetermined" states. For the example shown in FIG. 3, there are sixty such overdetermined states. Thus, of the sixty-four possible states, four are distinct states (at maximum amplitude extremes of the 16 QAM constellation). Of the 16 desired states, only 12 output words are selected for the 60 overdetermined states and four output words are selected for the maximum amplitude output states. Each of these 16 distinct states (12+4) is represented by a symbol on the constellation illustrated in FIG. 4. Such a multi-state constellation is known in the art as a 16 QAM constellation.

Figure 4:
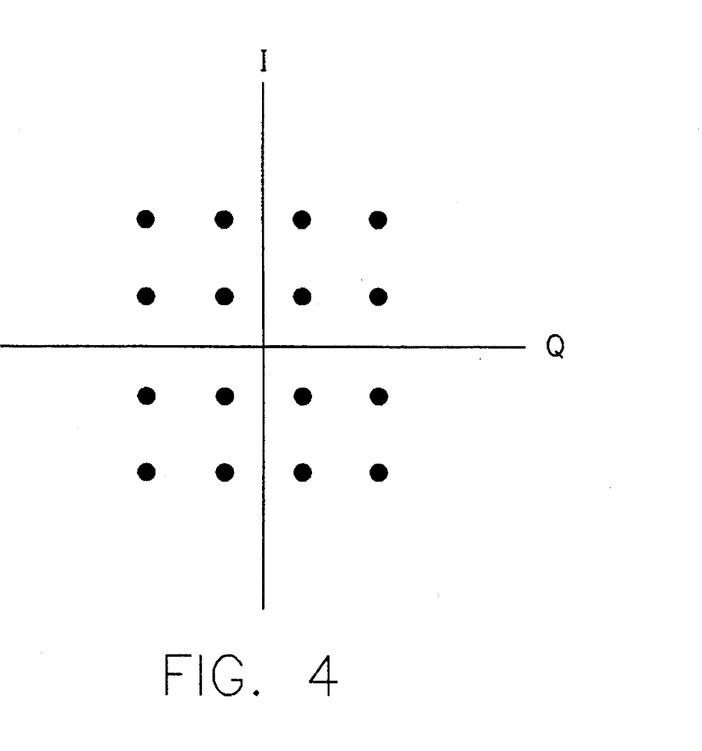
FIG. 4 illustrates a signal constellation representing the sixteen possible distinct states of a signal that is produced by the Modulating Array Transmitter of FIG. 3.

As was stated, each individual state of the 16 state QAM constellation corresponds to one unique combination of the 4-tuple data bit signals that are input into the look-up table 14. As such, when one of the storage locations is selected within the look-up table 14 in response to the input signals, the lookup table 14 outputs sets of 6-bit signals, where each 6-bit output is predetermined to correspond to one particular QAM constellation state.

Figure 5:
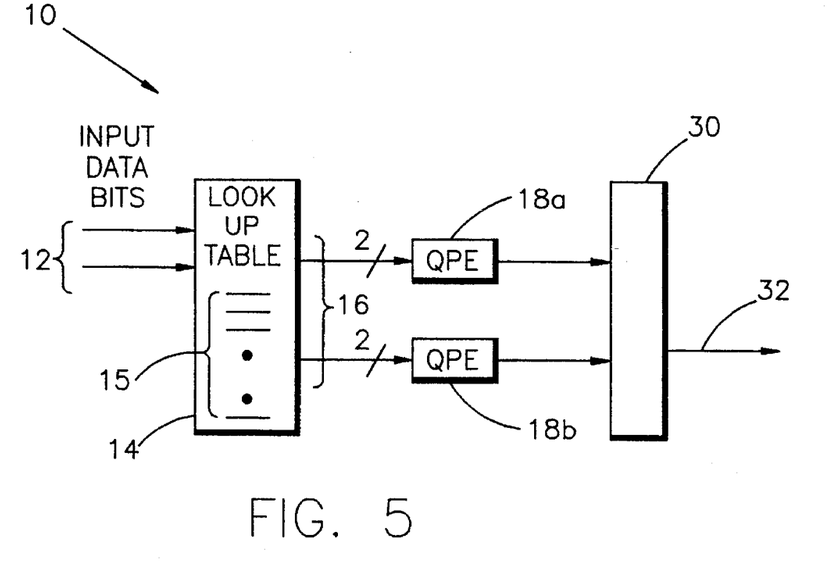
FIG. 5 is an illustration of a Modulating Array Transmitter comprising two quadraphase power elements, a look-up table, and a power combiner.
Figure 8A:
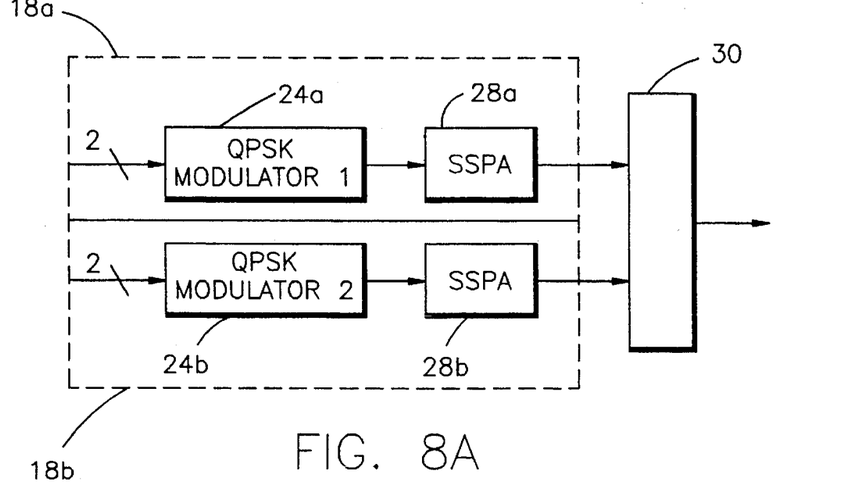
FIG. 8a illustrates a portion of the Modulating Array Transmitter shown in FIG. 5.

FIG. 5 illustrates another example of a MAX 10 wherein there are a first and a second QPE 18a, 18b, respectively, and a look-up table 14 having at least nine storage locations 15, each for storing four bits. FIG. 8a illustrates a portion of the MAX 10 of FIG. 5, wherein a first QPSK modulator 24a and a SSPA 28a form QPE 18a, and a second QPSK modulator 24b and a SSPA 28b form QPE 18b. The MAX 10 of FIG. 5 is capable of producing nine QAM states. Of these nine states, there are five states that are overdetermined.

Figure 8B:
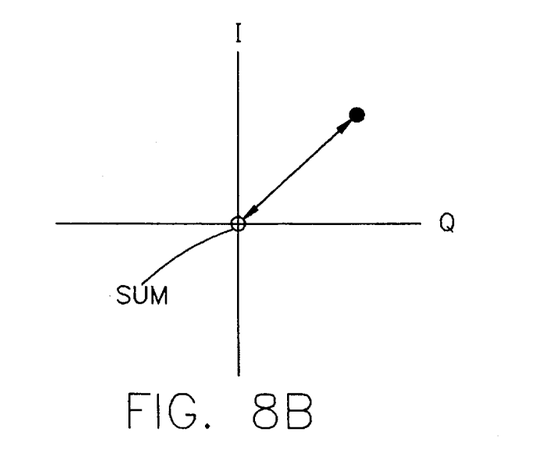
FIG. 8b illustrates an example of a vectorial summation of two states that are produced by the quadraphase power elements of the Modulating Array Transmitter illustrated in FIG. 5.

Referring to FIGS. 8a and 8b, for example, one such state (a zero state) is produced by the MAX 10 upon the application of the digital values represented by the sets of N-bits 11 and 00 to the first QPSK Modulator 24a and the second QPSK Modulator 24b (or vice versa), respectively. The same state also results from the applications of the following sets of N-bits to first QPSK Modulator 24a and the second QPSK Modulator 24b (or vice versa), respectively: 00,11; 10,01; 01,10. The zero state is thus considered to be quadrupely overdetermined.

Figure 6A:
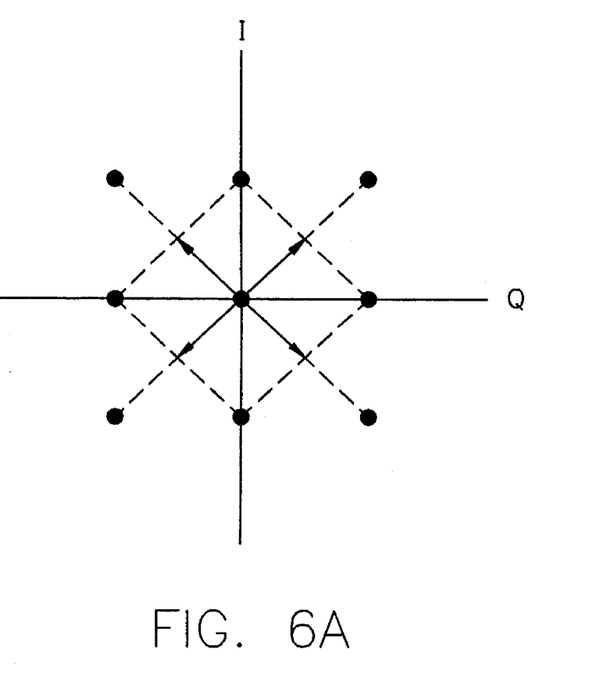
Figure 6B:
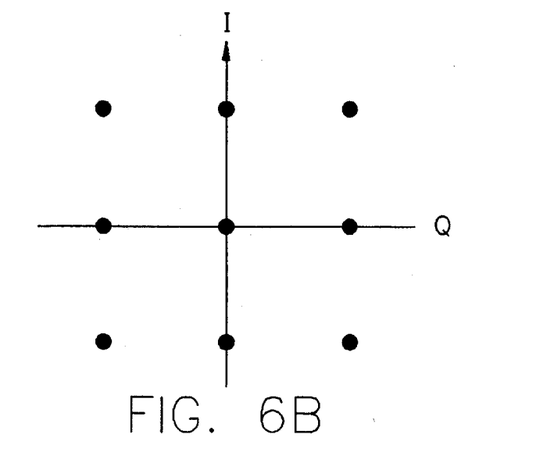
FIG. 6b illustrates a signal constellation representing the nine possible distinct states of a signal (9 QAM) that is produced by the Modulating Array Transmitter of FIG. 5.
Figure 6C:
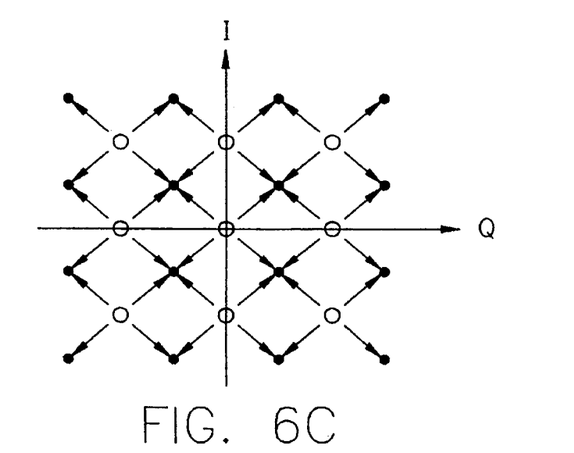
FIG. 6c illustrates modifications to the 9 QAM constellation when a third QPE is added to thus produce 16 QAM.
Figure 8C:
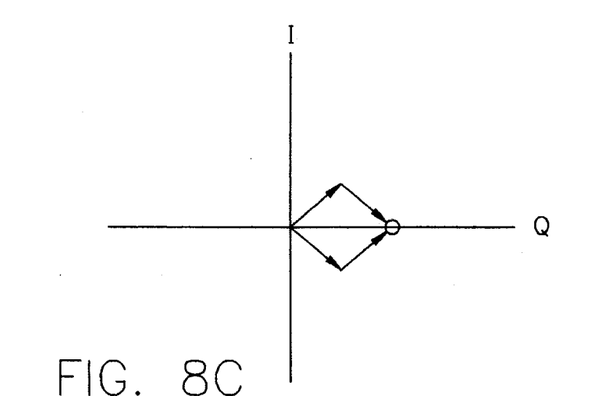
FIG. 8c illustrates an example of independent vectorial summations performed by the power combiner of the Modulating Array Transmitter of FIG. 5, which summations result in overdetermined states.

FIG. 8c illustrates another overdetermined state produced by the MAX 10 of FIG. 5. This state results from the application of the following sets of N-bits to the first QPSK Modulator 24a and the second QPSK Modulator 24b (or vice versa), respectively: 11,01; 01,11. There are nine distinct states for the MAX 10 illustrated in FIG. 5. These states are represented by the loci shown in the QAM constellations of FIGS. 6a and 6b. In FIG. 6a, the leader lines represent the vectors of the possible digital signal values (i.e., sets of N-bits) that may be input into the QPSK Modulators 24 of FIG. 8a. The dashed lines shown in FIG. 6a represent vectorial summations performed by the power combiner of FIG. 8a on the possible states that may be generated by each of the QPSK modulators 24 of FIG. 8a. Note that the leader lines overlap the dashed lines on certain portions of the FIG. 6a illustration. FIG. 6b illustrates a signal constellation representing the nine possible distinct states of a signal that is produced by the Modulating Array Transmitter of FIG. 5, while FIG. 6c illustrates modifications to the 16 QAM constellation when a third QPE is added.

Figure 7:
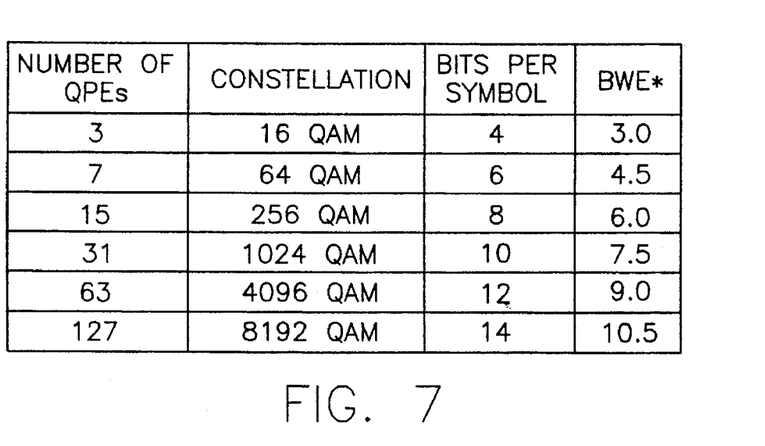
FIG. 7 is a table showing characteristics of various embodiments of a Modulating Array Transmitter, wherein each embodiment comprises a different number of quadraphase power elements.

As was previously stated, for applications where it is necessary to transmit signals through severely bandwidth-limited frequency channels, it is desirable to transmit many data bits per symbol. For such applications, additional QPEs 18 may be employed within the MAX 10. The table shown in FIG. 7 represents examples of QAM constellations, the number of bits represented by a respective QAM constellation, and the bandwidth efficiencies (bits/second/Hz) associated with MAX 10s having respective numbers of QPEs 18 as shown in the table. The table assumes a bandwidth occupancy of 1.2 Hz/symbol/second and a forward error correction rate of 0.9. It should be noted that for each of the MAX 10s listed in the table, the number of bits per symbol is equivalent to the number of data bits addressing the associated look-up table 14.

In practice, when the MAX 10 is first initiated, the data storage device (e.g., RAM) 14 has not been written with the desired constellation mapping data, nor the preferred 6-tuples to achieve the overdetermined states. In practice, the ensemble of QPSK modulators and power amplifiers will exhibit small (amplitude and phase) state errors (see FIGS. 10a and 10b) due to parasitic differential phase shifts and saturated power level differences. All of the overdetermined states of the MAX 10 are then exercised and examined for proximity to the desired constellation states. If the individual states are resolvable in the measurement, then each state is associated with a unique 6-tuple. The state mapping is optimized by selecting only those 6-tuples that lie most closely, in the I-Q plane, to the optimum desired constellation states. In this manner, the constellation mapping between the input 4-tuples (in this example) and the 6-tuples stored in the data storage device 14 is selected in an empirical manner.

Figures 10A, 10B:
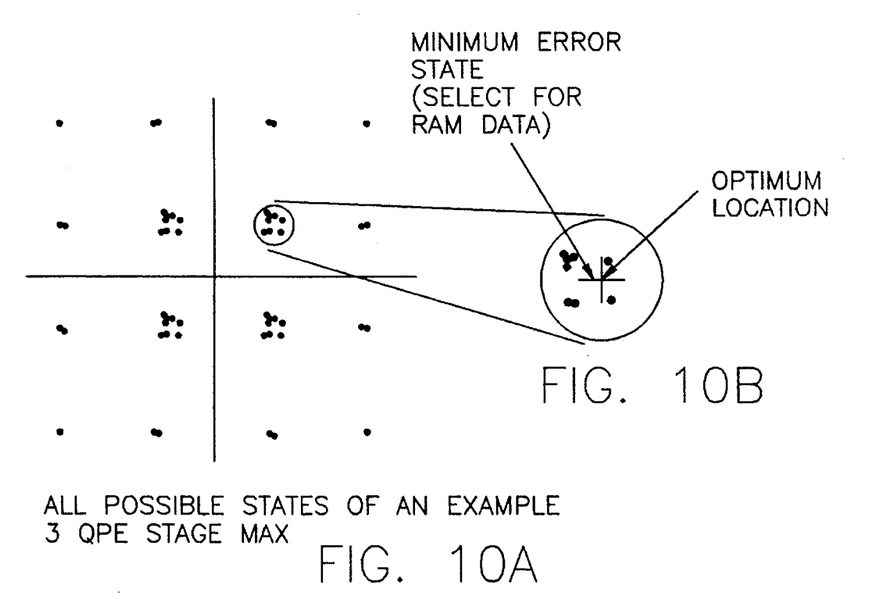
FIGS. 10a and 10b illustrate an exemplary X-Y output from a sampling oscilloscope, and are useful in explaining a method of initializing the Modulating Array Transmitter.

By example and referring to FIGS. 10a and 10b, a coherent detector is driven by the QAM signal from the transmitter. A coherent (unmodulated) carrier signal serves as a phase reference for the coherent detector. The coherent detector has a complex output separating I and Q signal components from the complex QAM signal. An X-Y sampling oscilloscope can be connected so that the horizontal deflection is driven from the Q output of the coherent detector and the vertical deflection is driven from the I output. The oscilloscope is sampled with the symbol clock signal so that one display (dot) is displayed for each symbol period. In this mode the transmission system is driven by random data. The resulting oscilloscope X-Y display (FIGS. 10a and 10b) is thus an ensemble of many I-Q symbol states that, in general, exhibit channel noise, distortions, intersymbol (filter induced) interference, etc. When the MAX 10 is clocked at a low data rate with a noise-free channel, the X-Y display accurately represents the MAX scattering.

In practice, where a MAX 10 is used that includes a large number of QPEs, the MAX 10 may generate signal constellation states that are not sufficiently distant from one another in Euclidean space, resulting from a reduction of the constellation precision. This reduction may occur due to, for example, output power imbalances and/or phase errors that are associated with the QPEs 18. These effects can result in impaired bit error rate performance. As such, as constellation precision reduces, a particular threshold error probability is reached at a channel signal-to-noise ratio that is higher than that at which such an error probability is reached for a more precise constellation. Thus, it may be desirous to compensate by controlling, for example, the saturated output power and spurious phase shift levels of each QPE 18. By example, for the MAX 10 corresponding to the 1024 QAM constellation listed in FIG. 7, such compensation can be achieved by controlling the power and phase shift levels associated with each QPE 18 such that none of the QPEs 18 exhibit saturated power or spurious shift levels that differ, for example, by more than 0.1 dB or 2 or 3 degrees, respectively.

Figure 9:
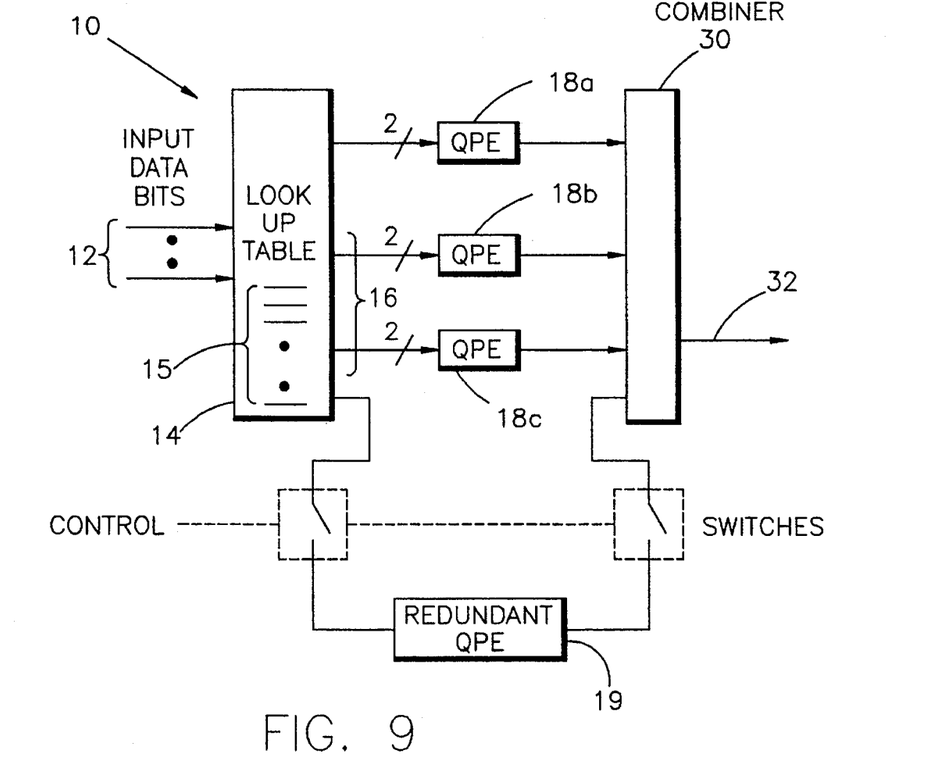
FIG. 9 illustrates an example of the Modulating Array Transmitter of FIG. 5 having a redundant quadraphase power element, the example being given for a 16 QAM transmitter.

The MAX 10 may be employed with redundant QPEs which can serve as "back-up" devices in cases wherein one or more of the non-redundant QPEs 18 (also deemed "primary QPEs" 18) fail. The use of redundant QPEs increases the performance reliability and effective lifetime of the MAX 10. The redundant QPEs are configured with respect to the primary QPEs 18 in such a manner that when a primary QPE 18 fails, the primary QPE 18 is switched off, and a redundant QPE 19 is switched in to replace the failed QPE. An example of a MAX 10 that employs a redundant QPE 19 is illustrated in FIG. 9. FIG. 9 also illustrates an example of a switching arrangement for a redundant QPE 19 with respect to the MAX 10 (switching arrangements for the primary QPEs 18 are not illustrated).

In applications where redundant QPEs are employed, the words stored within the look-up table need to have an adequate size in order to accommodate the redundant QPEs. For example, aMAX (not illustrated) comprising eight QPEs, one of which is redundant, has a look-up table which is capable of storing one word of sixteen bits at each of sixty-four storage locations. If one more additional redundant QPE is employed in this particular MAX 10, the required word size is eighteen bits.

In the event that a primary QPE 18 fails, systematic testing of the MAX 10 may be done to determine which QPE 18 of the MAX 10 has failed. This testing is done by switching off particular primary QPEs 18 such that only one remains powered-on. The output of the powered-on QPE 18 is detected to verify that the output phase state correctly corresponds to the input data bits to that QPE (i.e. the unique combination of input data causes the MAX 10 to generate a state that is anticipated). This testing process is continued for each primary QPE 18. Where it is determined that a particular QPE 18 produces output states that do not correctly correspond to the particular input bits, the failed QPE is identified and may be switched off and replaced by a redundant QPE 19 as described above.

Once the failed primary QPE is identified, the look-up table 14 is reloaded such that the switched-in replacement QPE receives digital signals output from the look-up table 14 in the same manner as did the failed primary QPE 18. This is accomplished by switching the look-up table 14 to a write mode. Thereafter, each of the sixty-four storage locations is addressed and an appropriate word is loaded at each location. In this manner the replacement QPE receives the digital signals (i.e. data bits) in the same manner as did the failed QPE. The loading of the look-up table may be facilitated via the use of, for example, a serial data bus.

In practice, an array penalty may occur in applications employing redundant QPEs within the MAX 10. The amount of array penalty that occurs is dependant upon the number of redundant QPEs employed in the MAX 10 (i.e., a greater array penalty occurs for a MAX 10 having a greater number of redundant QPEs than for one having a lesser number of QPEs). The array penalty is defined as the difference between the power output by a MAX 10 having no redundant QPEs and the power output by a MAX 10 having at least one redundant QPE. The array penalty results from the impedances of switched-off redundant QPEs causing some RF power loss in the MAX 10. It is assumed that while a redundant QPE is switched off, its impedance is nominally the same as that of a powered-on primary QPE. However, unlike a primary QPE, the redundant QPE contributes no power to the MAX output 32. In theory, the array penalty can be determined by calculating the output power associated with a Norton or Thevenin equivalent circuit of the MAX 10 having no redundant QPEs. That result is ratioed with the output power associated with a Norton or Thevenin equivalent circuit of the MAX 10 having at least one redundant QPE. In the calculation the equivalent source of a redundant QPE has either a zero current value (for a Norton equivalent circuit) or a zero voltage value (for a Thevenin equivalent circuit). The result of the ratio computation gives the theoretical power loss of the MAX 10 having one or more redundant QPEs.

However, it has been determined that the array penalty is minimal for MAXs 10 which comprise relatively few primary and redundant QPEs (e.g., for a MAX 10 comprising 7 to 15 primary QPEs only one redundant QPE may be required).

Figure 11:
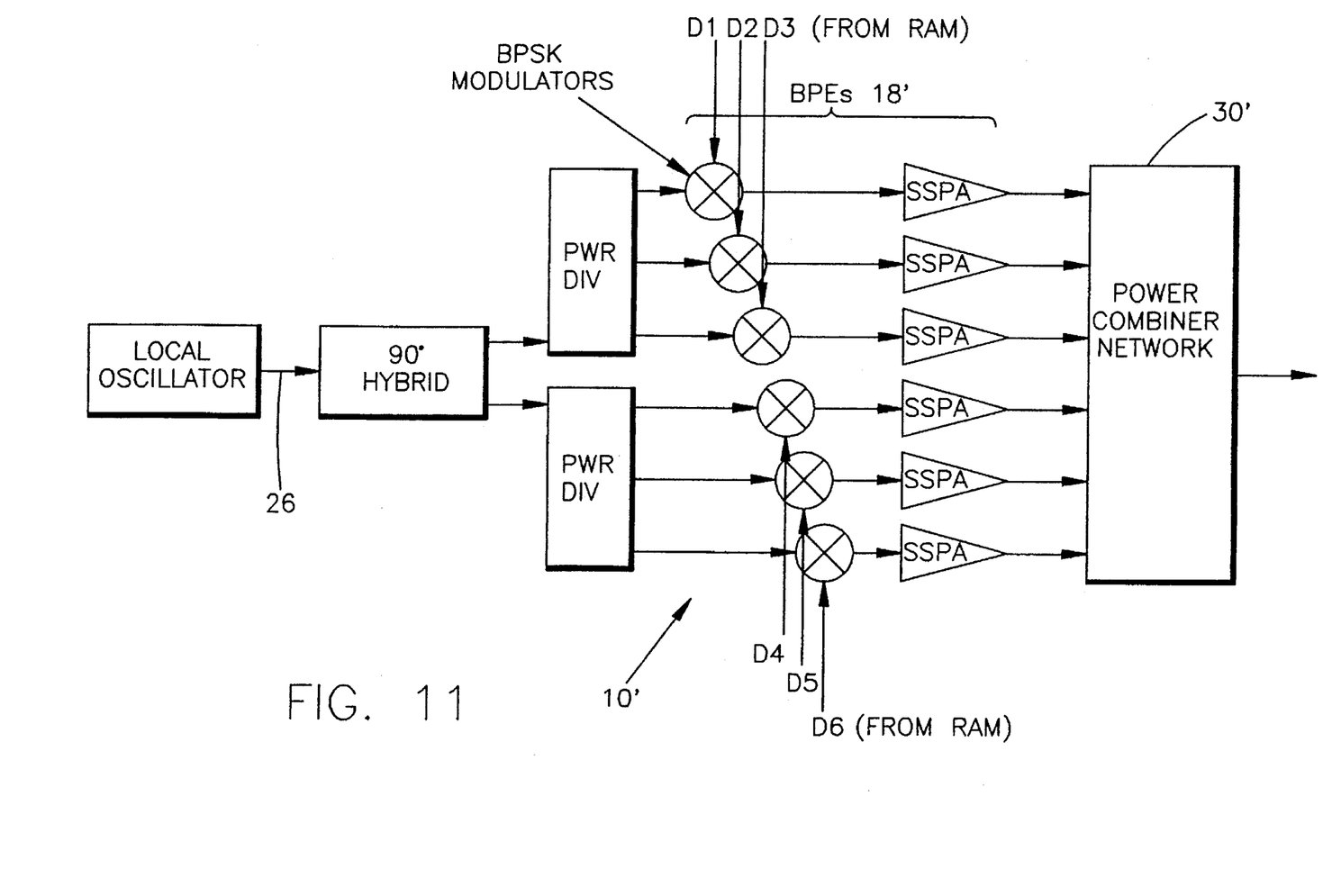
FIG. 11 illustrates a second, BPSK, embodiment of this invention.

Although described above in the context of a QPSK embodiment, the teaching of this invention is not so limited. For example, and referring to the MAX 10' of FIG. 11, the number of SSPAs may be doubled, and the QPSK modulators replaced by twice as many biphase phase shift keying (BPSK) modulators, thereby forming Biphase Power Elements (BPEs) 18'. Each BPSK modulator is driven by one bit output from the data storage device 14, and half of the BPSK modulators are driven in phase quadrature (90° phase shifted) with respect to the other half. The SSPA output combiner 30' thus must accommodate twice the number of SSPA outputs. One advantage of this embodiment is that it provides a simple means of doubling the MAX output power with little added complexity.

It should thus be clear that while the invention has been particularly shown and described with respect to preferred embodiments thereof, it will be understood by those skilled in the art that changes in form and details may be made therein without departing from the scope and spirit of the invention.

What is claimed is:

1. A method for producing one of a plurality of symbols, wherein the produced symbol represents j bits, comprising the steps of:

applying j input bits to a data storage device to output N bits to N/2 QPSK modulators, each of the N/2 QPSK modulators receiving a pair of the N bits, each of bit pairs specifying one of four phase shifts;

within each of the N/2 QPSK modulators, QPSK modulating a reference signal in accordance with a phase shift specified by the received bit pair;

amplifying the outputs of each of the N/2 QPSK modulators to produce respective amplified signals; and combining the amplified signals to produce one of a plurality of QAM symbols, wherein each produced QAM symbol represents a particular value of the j bits.

2. A method as set forth in claim 1, wherein the plurality of symbols form a constellation, and wherein the number of symbols of the constellation is a function of the number of j bits.

3. A method as set forth in claim 1, wherein the step of combining produces one of up to $2^j$ symbols of a symbol constellation.

4. A method as set forth in claim 1, wherein the step of applying further comprises the steps of: applying the j input bits to a plurality of address inputs of the data storage device, in response to the applied j bits, selecting a corresponding one of M words stored within the data storage device, each of the M words being comprised of a plurality of subsets of the N bits, to output the plurality of subsets of the N bits to the N/2 QPSK modulators.

5. A method as set forth in claim 4, wherein the step of combining the amplified signals produces one of M distinct QAM symbols of the constellation, and wherein the one of M distinct symbols represents the particular value of the applied j bits.

6. A method as set forth in claim 1, and further comprising the initial steps of:

applying a plurality of j-bit input patterns to the data storage device;

monitoring the combined amplified signals; and selecting as QAM symbols those combined amplified signals that are located nearest to predetermined locations in an I-Q plane.

7. A modulating array transmitter comprising:

data storage means storing M words each comprised of N bits, said data storage means having a plurality of inputs for selecting one of said M words to output said N bits of said selected word;

a plurality of modulating means, each of, said modulating means having a first input coupled to a reference signal and at least one second input coupled to an output of said data storage means, each of said modulating means comprising means for phase modulating said reference signal for generating one state of a signal constellation in response to receiving a subset of said N bits from said data storage means;

a plurality of amplifying means, individual ones of said plurality of amplifying means being coupled to an output of an individual one of said plurality of modulating means; and means for combining outputs of said plurality of amplifying means to generate a symbol representing a value of data bits that are applied to said plurality of inputs of said data storage means.

8. A modulating array transmitter as set forth in claim 7, wherein each of said plurality of modulating means is a QPSK modulator, and wherein said subset of N bits is equal to two bits.

9. A modulating array transmitter as set forth in claim 7, wherein each of said plurality of modulating means is a BPSK modulator (180° phase keyer), and wherein said subset of N bits is equal to one bit.

10. A modulating array transmitter as set forth in claim 7, wherein individual ones of said plurality of modulating means that are coupled to individual ones of said plurality of amplifying means form a portion of a power element, and further comprising:

at least one switching means;

at least one spare power element, comprising:

a redundant phase modulating means; and a redundant amplifying means coupled to an output of said redundant phase modulating means;

wherein said at least one spare power element, said at least one switching means, and at least one of said power element are configured in a manner such that said at least one switching means can switchably couple said at least one spare power element to outputs of said data storage means.

11. A transmitter comprising:

a plurality of PSK modulators each comprising means for PSK modulating a local oscillator signal in accordance with a digital input signal comprised of a predetermined number of bits;

a plurality of amplifiers individual ones of which have an input coupled to an output of one of said PSK modulators; and means for combining together amplified PSK modulated signals emanating from said plurality of amplifiers and outputting a composite signal representing a symbol within a QAM symbol constellation.

12. A transmitter as set forth in claim 11, and further comprising data storage means storing M words each comprised of a plurality of bits, said data storage means having a plurality of address inputs for receiving j digital input signals selecting one of said M words, said data storage means having a plurality of outputs for outputting, for each of said selected M words, said predetermined number of bits to each of said PSK modulators.

13. A transmitter as set forth in claim 11, wherein said combining means includes means for vectorially adding said amplified PSK modulated signals emanating from said plurality of amplifiers.

14. A transmitter as set forth in claim 11, wherein each of said PSK modulators is a QPSK modulator.

15. A transmitter as set forth in claim 11, wherein each of said PSK modulators is a BPSK modulator.

* * * * *